Patented Sept. 1, 1936

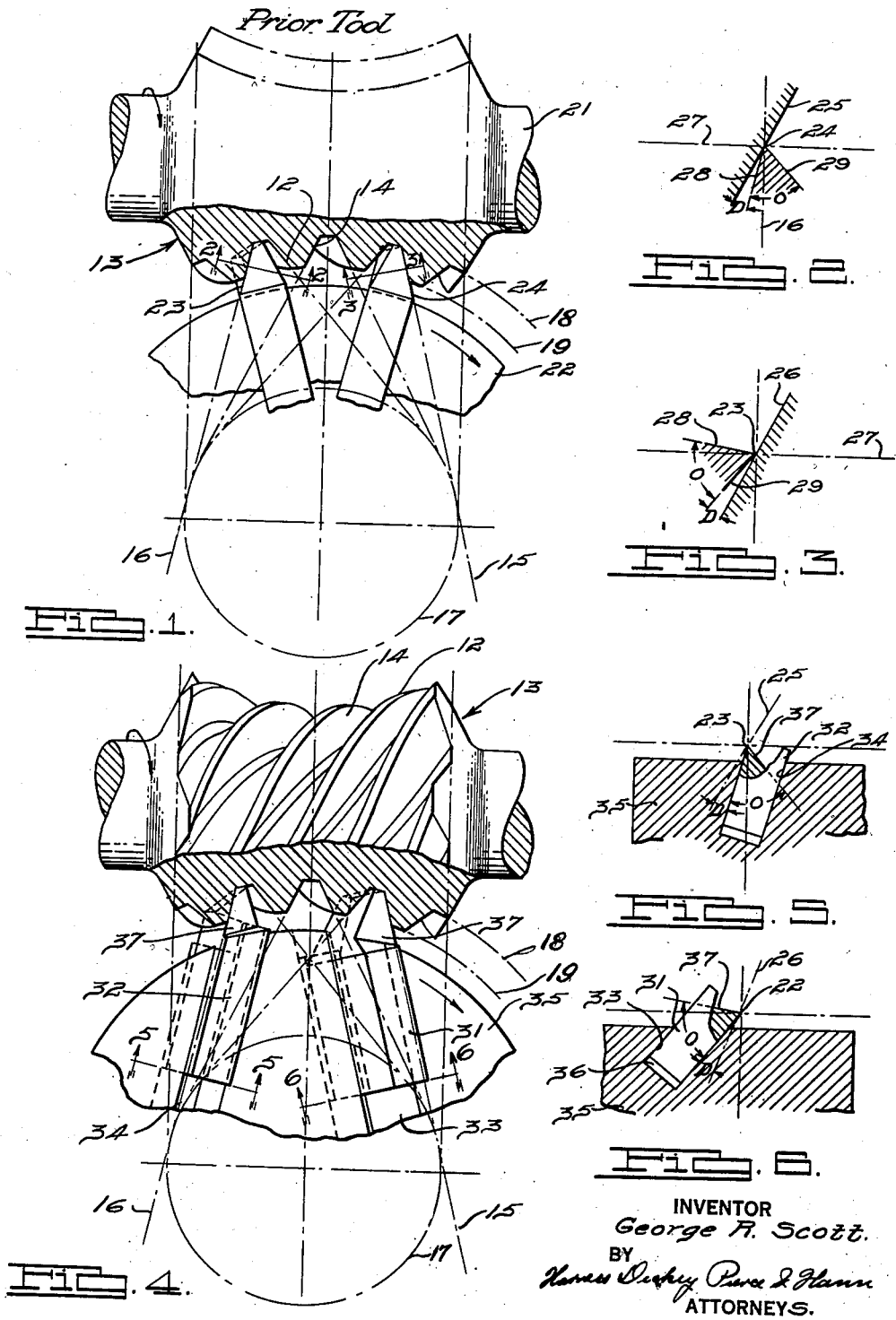

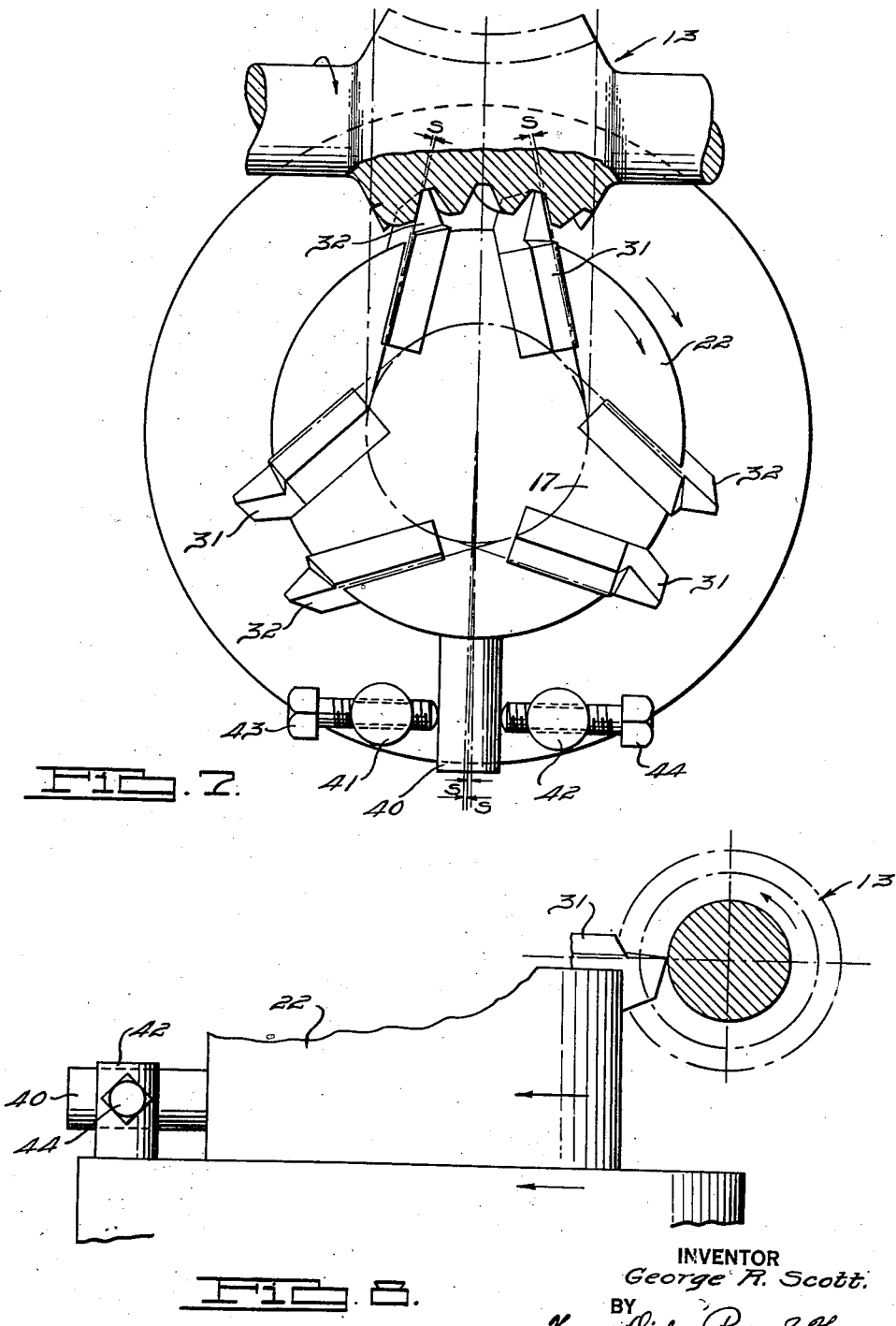

2,052,804

UNITED STATES PATENT OFFICE 2,052,804

THREAD FORMING CUTTING TOOL

George R. Scott, Norfolk, Va.

Application November 2, 1931, Serial No. 572,527

3 Claims. (Cl. 29—105)

This invention relates to cutting tools and particularly to a tool for cutting globoidal worms and the like which may be readily sharpened and adjusted to have the cutting edges disposed in predetermined planes.

Difficulty has been experienced in the past in providing cutting tools for worms of the globoidal type due primarily to the inability to reestablish the cutting edges of the tool in the cutting planes after sharpening. From a practical manufacturing standpoint, the fact that the cutting tools lose their original form in sharpening, contributes, in a large measure, to the difficulties which prevent the widespread use of this type of worm gear.

One object of this invention is to provide methods and means capable of producing globoidal worms of a constant form, regardless of the fact that the tools thereof have been repeatedly sharpened and irrespective of the lead and/or pressure angles of the thread of the worm to be machined.

In the past worms of the globoidal type have been generated either with solid cutters, representing in form, the mid section of the mating wheel, or with a removable tool or tools positioned on a radius from the center of rotation of a supporting fixture.

The solid cutter is limited to the production of worms having small lead angles, for in the case of worms having large lead angles, the cutter would be practically destroyed when providing suitable clearance below the cutting edges to accommodate the variations in the lead angles presented in this type of worm. Such a cutter, in any event, when sharpened, would lose its form regardless of the method of sharpening and would thereafter produce worms of a different form from that desired. For practical purposes, therefore, the type of cutter heretofore produced is of a questionable value as a production tool for globoidal worms.

When employing a cutter head having inserted cutting tools one or both edges of which are intended to be effective, certain fatal defects are likewise encountered. This is especially true when the cutter head is employed for cutting worms having large lead angles and for production purposes. It is well known that a tool having no clearance back of the cutting edge will not cut properly and that in case the tool is given the proper relief that subsequent sharpening of the tool at the top, end or side will destroy the form and change the flank of the thread cut thereby.

Accordingly, it is another object of this invention to provide a method and means for obviating the change of form to the worm thread when the tool is sharpened and to provide means for producing the desired form in worms of any lead, irrespective of the number of subsequent sharpening operations on the tool.

A further object of my invention is to provide a cutter head with a plurality of sets of tools which are mounted in accordance to my invention which shall be effective to produce a plurality of cuts on the worm during each revolution of the cutter head.

Other objects and features of novelty of my invention will be either specifically pointed out or will become apparent, when referring, for a better understanding of my invention, to the following description in conjunction with the accompanying drawings, wherein:

Figure 1 is a broken plan view, partly in section, of a worm and cutting tool showing a portion of a tool and fixture which is conventionally employed in the art, Figs. 2 and 3 are sectional views of the structure illustrated in Fig. 1, taken on the lines 2—2 and 3—3, respectively, thereof, Fig. 4 is a broken view, partly in section, of a worm and a tool fixture which embodies features of my invention, Figs. 5 and 6 are sectional views of the structure illustrated in Fig. 4, taken on the lines 5—5 and 6—6 respectively, thereof, Fig. 7 is a reduced, plan view, partly in section, illustrating a worm, tool and fixtures which embodies features of my invention, and Fig. 8 is a broken view, in elevation, of the structure illustrated in Fig. 7.

The thread 12 on the worm 13, herein considered, are of such form that when taken in any plane of the worm axis, as in the shaded portion of Fig. 4, their flank lines 14 are straight and so disposed that the opposing pairs when projected, as at 15 and 16, are tangent to the opposite sides of a base circle 17, the center of which is coincident with the axis of the wheel with which the worm is to mate. In the improved worm the thread and gap forms are respectively uniform, their inner and outer limits being defined by the arcs of two concentric circles 18 and 19 having their centers common with that of the base circle 17.

The method heretofore employed in forming threads on worms of the globoidal type consisted in mounting the globoidal blank in a lathe or similar machine and removing the waste material from the thread gap by cutters mounted in a fixture which is arranged to rotate about an axis at right angles to that of the blank. The mounting of the blank and the cutting tools in the conventional manner is illustrated in Figs. 1, 2, and 3. The machine is so geared as to cause the blank carrying spindle 21 and the tool holding fixture 22 to rotate in predetermined speed relation. Accuracy of result depends upon the correct positioning of the cutting edges 23 and 24 which must lie within the plane of the worm axis and be so supported that their angular arrangement be in strict accord with the desired circular pitch. The tools may be provided with single edges 23 or 24 for forming either right or left flanks on the thread, or each may be constructed to have both edges 23 and 24 for finishing both flanks within a single tooth gap. The feeding of the edges 23 and 24 into the blank is accomplished either by advancing the tools within the fixture 22 while the axis of the latter remains fixed or by advancing the fixture and tools as a unit.

As pointed out above, the forming accuracy of the cutting edges 23 and 24 depends upon their being arranged correctly in the fixture. That is to say, the cutting edges should be so positioned as to be always within the plane of the worm axis and radially n accordance with the required circular pitch. The difficulty of maintaining this condition during the subsequent sharpening of the tool, when arranged as illustrated in Fig. 1, is at once made manifest since the grinding of either or both flanks of the tools will cause a recession of the edges 23 and 24 which will destroy the relative arrangement both with respect to the plane through the worm axle and with each other. A difficult combination of grinding and resetting is required to reestablish the edges 23 and 24 in their original positions.

When the ends of the tool are sharpened the diameter is reduced and when the sides are sharpened the cutting edges on one side will be such that if the straight line section is extended it would fall inside of the base circle 17 and produce a thread having a different pressure angle from that for which the tool was originally intended. When the other side of the tools are sharpened a line in extension of the sharpened edges would fall outside of the base circle 17 with a similar change in the pressure angle of the thread. It will, accordingly, be seen that as soon as this type of tool is sharpened it will lose is form and will no longer produce the desired shape of worm thread.

In Figs 2 and 3, I have illustrated sections taken at right angles to the plane of the worm axis, or shaded portion of Fig. 1, on the lines 2—2 and 3—3 respectively thereof, to show the relative inclination of the lips of the tool employed in forming the left and right flanks of the thread, each being viewed in the direction of one of the corresponding thread flank tangents 15 and 16. In these views, the left and right flanks of the threads are shown respectively at 25 and 26, while the position of the worm axial plane is indicated by the line 27. The tools have a common lip angle 0. The thread flanks 25 and 26 vary slightly in their inclination to the plane 22 during their passage and the lip of the tools are adjusted to allow the desired angle of clearanace D. In the shaded portion of Fig. 1, the flanks of the worm thread are shown as completed, the tool edges 23 and 24 having been advanced to positions coincident with the desired tangents 15 and 16 and to the arc 18. The two edges 23 and 24 are formed by the apex of the two surfaces 28 and 29. When the edges 23 and 24 become dull, resharpening is accomplished by grinding either or both of the surfaces 28 and 29, which, as above stated, must result in disarrangement. Thus, in Figs. 2 and 3, if either or both of the surfaces 28 and 29 are ground, the edges 23 and 24 will no longer coincide with the intersection of the tangents 15 and 16 and the worm axial plane 27. Considerable difficulty will be experienced when attempting to grind the tool in such manner that, when they are extended in the fixture 22, the cutting edges 23 and 24 thereof will be coincident with the intersection of the plane 15 and 16 and the worm axial plane 27.

In practicing my invention I overcome this difficulty by employing a method for positioning the tools in the fixtures in such manner that they may be shifted, after being sharpened, into coincidence with one of the planes while retaining a predetermined relationship with the other of said planes. Referring to Figs. 4, 5, and 6, I have illustrated one type of tool which embodies this feature of my invention. It will be noted that by positioning the tools to have their cutting sides disposed in the plane of the tangents 15 and 16, to the base circle 17, in contra-distinction to the present practice of having the tools radiate from the center of rotation of the fixture, the above difficulties are obviated and an extremely accurate and inexpensive tool will be provided. By tilting the tools in the fixture to give the sides of the cutting portion the desired clearances, it is only necessary to grind the top surface and to shim up the bottom of the tool, to bring the tool back to its original position. In like manner, the tool may be extended any desired amount without changing its form and I have, therefore, provided a method and means for producing worms having the desired thread form by inexpensive tools which can be readily sharpened and adjusted and which may be employed for the entire life of the tool.

In order that the advantages of my construction may be readily distinguished from that now employed in the art, I have duplicated the construction illustrated in Figs. 1, 2, and 3 in the embodiment of my invention illustrated in Figs. 4, 5, and 6 to clearly demonstrate the simple readjustment of the cutting edges subsequent to their grinding. I employ rectangular shaped tools 31 and 32 which are positioned in slots 33 and 34 respectively in the fixture 35, the slots being so disposed that the extension of one of their sides passes through the extension of the tooth flanks, which are the tangents 15 and 16 of the base circle 17. The top of the tools are ground in a predetermined manner to provide cutting edges which are mounted to be coincident with the tangents 15 and 16 at the intersection of the axial plane 27. After the cutting edges 23 and 24 have become dull, it is only necessary to grind the top surface 37 of the cutting end of the tools to provide sharp cutting edges 23 and 24 thereon.

To position the resharpened cutting edges in the fixture 31, it is only necessary to provide one or more shims 36 between the base of the slots 33 and 34 and the tools 31 and 32, respectively, to bring the cutting edges 23 and 24 in the plane of the worm axial plane 27. When this adjustment is made the cutting edges 23 and 24 are coincident with the tangents 15 and 16, because of a positioning of the side of the tool in the plane through the tangents. The angle of disposition of the slots 33 and 34 is chosen to provide the proper amount of relief to the cutting edges 23 and 24 and the degree of slope of the top dressing edges 37 is regulated by the angle 0 which is the angle between the sides forming the cutting edges 23 and 24. It will therefore be seen that it is only necessary to grind the top surface 37 of the tool an amount which will produce sharp cutting edges 23 and 24 and to adjust the tools in the fixture by a simple shimming operation to effect accurate cutting after the tools have become dull.

It is to be understood that suitable clamping means are provided for retaining the tools 31 and 32 in predetermined adjusted position in the fixture 35 and any means well known in the art to be suitable may be utilized for this purpose. It is also to be understood that it is within the contemplation of my invention to utilize other means besides the shims 36 for adjusting the tools 31 and 32 in the slots 33 and 34, respectively, such for example as adjustable sloping surfaces or by set screw adjustment.

In Figs. 7 and 8 I have illustrated a tool holding fixture 22 which is provided with a plurality of sets of cutting tools 31 and 32 which may be utilized to increase the production capacity of a machine by having a plurality of cutting tools pass across the worm blank during each rotation of the tool holder, rather than the passage of a single tool or set of tools during each rotation of the holder, as has been the practice theretofore.

An arm 40 extending from the tool supporting fixture 22 which is positioned between spaced posts 41 and 42 through which screws 43 and 44 respectively extend. The screws 43 and 44 are axially aligned with their points facing each other and engaging opposite sides of the arm 40. This construction permits the angular shifting of the tool about the center of the machine to effect the cutting of the worm thread as set forth in the co-pending application of Samuel I. Cone, Serial No. 188,214, filed May 2, 1927.

While I have illustrated and described but a single preferred embodiment of my invention, it will be understood that I do not wish to limit myself to a tool of straight sided form but desire it to be understood that any and all of my principles, herein set forth, may be utilized on tools, the sides of which may be concave or convex in shape or of any form well known to be suitable. With my present invention, I have made possible the commercial production of worms of the globoidal type through the provision of a fixture having tools which are mounted therein in such manner that after repeated sharpening, accurate cutting edges will be re-established through the simple adjustment of the tools relative to the fixture. It will be further apparent that various changes, omissions, additions and substitutions may be made in the structure herein illustrated and described, without departing from the spirit and scope of my invention, as set forth in the accompanying claims.

I claim as my invention:

1. A rotary tool holding fixture for machining a thread on a worm element of the enveloping type, which includes a tool receiving slot, a tool in said tool receiving slot having a cutting edge lying substantially in the plane of one wall of said slot and tangential to a circle whose center lies in the axis of rotation of said cutter, said cutting edge also lying in a plane through the axis of the worm to be machined, the plane of said wall and cutting edge being inclined to the axis of rotation of said fixture, and means to shift said tool in the plane of said wall so that, when the top surface thereof is ground, said cutting edge is maintained in said tangential plane and the plane through the worm axis.

2. A rotary tool holding fixture for machining a thread on a worm of the enveloping type, which includes a tool receiving slot, a tool in said tool receiving slot having a cutting edge lying substantially in the plane of one wall of said slot, said cutting edge also lying in a plane through the axis of the worm to be machined, the plane of said wall lying tangential to a cone which is coaxial with the axis of rotation of said fixture, and means to shift said tool in the plane of said wall so that, when the top surface thereof is ground, said cutting edge is maintained in said planes.

3. A rotary tool holding fixture for machining a thread on the worm of the enveloping type, which includes a pair of tool receiving slots, a tool in each of said tool receiving slots, each of said tools having a cutting edge disposed substantially in the plane of one wall of its respective slot, said cutting edges also lying in a plane through the axis of the worm to be machined, the planes of said walls both lying tangential to cones which are coaxial with the axis of rotation of said fixture, and means to shift said tools in the planes of said walls so that, when the top surfaces thereof are ground, said cutting edges are maintained in said planes.

GEORGE R. SCOTT.